US010542111B2

(12) United States Patent
Kelsey

(10) Patent No.: US 10,542,111 B2
(45) Date of Patent: *Jan. 21, 2020

(54) DATA COMMUNICATION IN A CLUSTERED DATA PROCESSING ENVIRONMENT

(71) Applicant: International Business Machines Corporation, Armonk, NY (US)

(72) Inventor: David R. H. Kelsey, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/047,823

(22) Filed: Feb. 19, 2016

(65) Prior Publication Data

US 2016/0248755 A1 Aug. 25, 2016

Related U.S. Application Data

(63) Continuation of application No. 14/625,747, filed on Feb. 19, 2015.

(51) Int. Cl.
*H04L 29/08* (2006.01)
(52) U.S. Cl.
CPC .......... *H04L 67/2852* (2013.01); *H04L 67/10* (2013.01); *H04L 67/14* (2013.01); *H04L 67/2842* (2013.01)
(58) Field of Classification Search
CPC ........ H04L 67/10–1097; H04L 67/2842–2857
See application file for complete search history.

(56) References Cited

U.S. PATENT DOCUMENTS

| | | | |
|---|---|---|---|
| 6,615,235 B1 * | 9/2003 | Copeland | H04L 61/1582 370/237 |
| 6,757,708 B1 * | 6/2004 | Craig | G06F 17/30902 707/999.01 |
| 7,206,910 B2 | 4/2007 | Chang et al. | |
| 7,318,074 B2 | 1/2008 | Iyengar et al. | |
| 8,117,156 B2 | 2/2012 | Krishnaprasad et al. | |
| 8,434,099 B2 | 4/2013 | Forin et al. | |
| 8,612,383 B2 | 12/2013 | Sandhu | |
| 9,240,886 B1 * | 1/2016 | Allen | H04L 9/32 |
| 9,258,793 B1 * | 2/2016 | Kilday | H04W 60/06 |
| 9,344,505 B1 | 5/2016 | Martin | |
| 9,460,141 B1 | 10/2016 | Coman | |

(Continued)

OTHER PUBLICATIONS

Kirby et al., "IBM WebSphere eXtreme Scale V7: Solutions Architecture", WebSphere Software, IBM, Dec. 2009, International Technical Support Organization, 98 pages.

(Continued)

*Primary Examiner* — Emmanuel L Moise
*Assistant Examiner* — Julian Chang
(74) *Attorney, Agent, or Firm* — Jorge R. Maranto

(57) ABSTRACT

Data can be communicated across a clustered data processing environment. A server can receive a request and a token from a web user interface component and search for the data object associated with the token in a local cache. If the data object is found, it can be used to communicate with a backend server, in order to receive a response with server-specific data. The response and the data object can be sent back to the web user interface.

4 Claims, 6 Drawing Sheets

(56) References Cited

U.S. PATENT DOCUMENTS

| | | | |
|---|---|---|---|
| 2002/0143868 A1* | 10/2002 | Challenger | G06F 17/30902 709/203 |
| 2005/0108191 A1* | 5/2005 | Iyengar | G06F 17/30902 |
| 2005/0240764 A1* | 10/2005 | Koshy | H04L 9/065 713/170 |
| 2007/0005965 A1* | 1/2007 | Nalliah | H04L 63/0823 713/168 |
| 2008/0144974 A1* | 6/2008 | Bhakta | G06F 17/3028 382/298 |
| 2008/0301705 A1* | 12/2008 | Videlov | H04L 67/1095 719/313 |
| 2009/0265771 A1* | 10/2009 | Chung | G06F 21/335 726/7 |
| 2010/0114919 A1* | 5/2010 | Sandhu | H04L 29/08729 707/755 |
| 2014/0280515 A1* | 9/2014 | Wei | H04L 67/02 709/203 |
| 2015/0121501 A1* | 4/2015 | Khalid | H04L 63/0815 726/8 |
| 2015/0331794 A1* | 11/2015 | Ren | G06F 17/30 709/214 |
| 2016/0261699 A1* | 9/2016 | Martin | H04L 67/146 |
| 2016/0328488 A1* | 11/2016 | Lytle | G06F 9/54 |
| 2017/0004049 A1* | 1/2017 | Coman | G06F 17/30345 |

OTHER PUBLICATIONS

IBM, "IBM InfoSphere Master Data Management V11.3 creates trusted views of your data assets to support operational and analytical initiatives," IBM United States Software Announcement 214-202, dated Jun. 25, 2014. Grace Period Disclosure, 45 pages.

Mell et al., "The NIST Definition of Cloud Computing," National Institute of Standards and Technology, U.S. Department of Commerce, Special Publication 800-145, Sep. 2011, 7 pages.

Kelsey, David R. H., "Data Communication in a Clustered Data Processing Environment", U.S. Appl. No. 14/625,747, filed Feb. 19, 2015.

List of IBM Patents or Patent Applications Treated as Related, dated Feb. 12, 2016, pp. 1-2.

\* cited by examiner

DATA COMMUNICATION IN A CLUSTERED DATA PROCESSING ENVIRONMENT

STATEMENT REGARDING PRIOR DISCLOSURES BY THE INVENTOR OR A JOINT INVENTOR

The following disclosure(s) are submitted under 35 U.S.C. 102(b)(1)(A): IBM InfoSphere Master Data Management V11.3 creates trusted views of your data assets to support operational and analytical initiatives, IBM United States Software Announcement 214-202, Jun. 25, 2014.

BACKGROUND

The present disclosure relates to data processing, and more specifically, to data communication across a clustered processing environment. Computers can be clustered, that is loosely or tightly connected computers that work together, so that in many respects, they can be viewed as a single system. The components of a cluster can be connected to each other through fast local area networks ("LAN"), with each computer used as a server running its own instance of an operating system. Data can be shared across these clusters, in order to improve performance.

SUMMARY

Embodiments of the present disclosure may be directed toward a computer implemented method for communicating data in a clustered data processing environment. The data can be communicated when the system receives, at a server, a request and a token from a first web user interface (UI) component. The token may have been created during the storing of a data object in a local cache. The system can search the local cache for the data object, using the token. The system can detect, from the search, the data object in the local cache and communicate with a backend server using the data object. The system can then receive, from the backend server, and in response to the request, server-specific data, and return to the first web UI component a response, based on the data.

Embodiments of the present disclosure may be directed toward a computer system for communicating data in a clustered data processing environment, where the system has a computer processing circuit configured to receive a request and a token from a first web user interface (UI) component. The token may have been created during the storing of a data object in a local cache. The system can search the local cache, using the token and for the data object. Based on the search, the system can detect the data object in the local cache. Using the data object the system can communicate with the backend server and receive, from the backend server and in response to the request, server-specific data. The system can return, based on the server-specific data from the backend server and the data held in the data object, a response across a clustered data processing environment.

Embodiments of the present disclosure may be directed toward a computer program product for communicating data in a clustered data processing environment. The computer program products may comprise a computer readable storage medium with program instructions, where the computer readable storage medium is not a transitory signal per se. The computer program instructions may be executable by a computer processing circuit to cause the circuit to receive a request and a token, from a first web user interface (UI) component. The token may be created during the storing of a data object in a local cache. The instructions may cause the circuit to further search the local cache using the token and for the data object; detect the data object in the local cache, and using the data object, communicate with the backend server. The instructions may further cause the circuit to receive server-specific data from the backend server, in response to the request, and return a response to the web UI component across a clustered data processing environment, where the response is based on the server-specific data and the data object.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
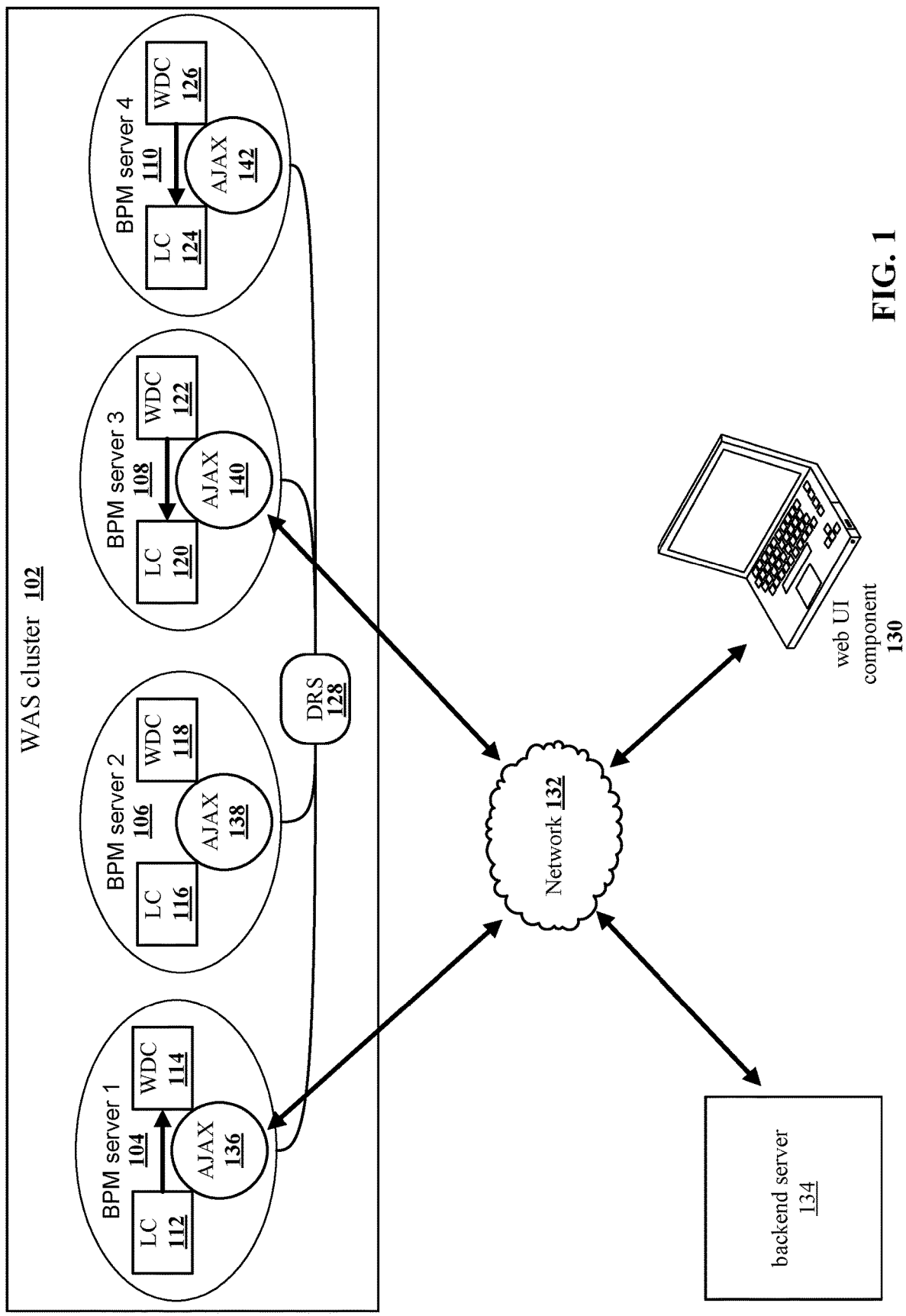
FIG. 1 depicts a system for communicating data across a clustered environment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate generally to data processing, more particularly to data communication across a clustered data processing environment. While the present disclosure is not necessarily limited to such applications, various aspects of the disclosure may be appreciated through a discussion of various examples using this context.

Servers in a clustered environment may need to communicate with a number of different users, as well as one or more backend servers. A web user interface (UI) component can work with various software via asynchronous JavaScript and XML (AJAX) to communicate with a server in order to communicate with a data-serving back end system. Web UI components may need to reference a backend server or servers using a specific configuration and credential set, which can be unique for a particular user of the web UI component. For security reasons, this information cannot be held by the web UI components themselves. However, the web UI components still may need to know which server and associated configuration and credentials to use. When servers are running in a clustered environment, the associated web UI components may need to run seamlessly without having to be fixed to a single server for its AJAX calls to a server.

In order to provide the web UI components with configuration and/or credentials that may be needed for the components to function across any number of different servers, the web UI components can be given a token for particular data which is a reference to a specific configuration, credential, and server to use when accessing the particular data. Code within the system's server (for example code within the Business Process Management (BPM) server) can understand the token, and it can retrieve the specifically created environment required for communication with the data server back end system ("backend server"). However, this information may need to be shared with all the other servers in the cluster in order to provide for seamless functionality across the cluster.

One way this functionality can be achieved is through the use of a data replication service. A data replication service (DRS) may transfer data, objects, or events among application servers. Many data replication services require a dynamic cache. In a clustered environment, the content placed in a dynamic cache may be shared with other servers in the cluster; if the cache objects are to be shared, they may need to be serializable in order to for the data to be replicated via the DRS to other servers.

In order to serialize the objects, as needed by a DRS using the dynamic cache to communicate across a clustered environment, code for the objects may need to be replicated or split from the software package, to be put into the shared library. This can be an obstacle to keeping update deployment for the software package process simple. For example, in order to update components of a software package without necessitating modified code for each package based on user-specific changes (thus providing streamlined updating capabilities), communication across servers in a clustered environment that does not require moving code into a shared library can be facilitated according to embodiments of the disclosed. An additional obstacle in using the DRS as indicated is the lack of serializability of some objects that may need to be shared across the clustered environment.

Consistent with embodiments, this obstacle can be circumvented by storing and retrieving the data object using a system which allows for the storage, replication, and sharing of data without requiring the object be serialized and the code placed in a shared library. Embodiments may include placing the data object in a local cache, and creating a token which can be passed to the web UI component upon storage of the data object, for future recall of the data object. The data object stored in the local cache can also be converted to a representable byte array and stored in a dynamic cache, using an interface already existing within and used by the DRS to replicate data across the servers in the cluster. By storing a byte array rather than a serialized version of an object, DRS can replicate the data across other servers, and it is retrievable from the dynamic cache without the need to have the code that represents the objects in a shared library. Thus, a complete software package installation and update process can occur without additional complication. This also can avoid the possibility of class cast exceptions which could occur due to the nature of how component updates are deployed. Notably, the communication across a clustered environment works with the already existing replication layer.

A web UI component can make a request to a backend server, the request goes to the AJAX implementation running inside the software. The AJAX implementation can use the token from the UI component to retrieve the necessary data the token represents from the local cache, rather than trying to retrieve it directly from the dynamic cache using the preexisting interface. If the data is found in the local cache, it can be returned to the AJAX implementation of the web UI component, so the data object can be used to communicate with the back end server and return the appropriate response to the web UI component, which may include the data object and/or server-specific data.

If the data object is not found in the initial search of the local cache, using the token, the system looks for the byte representation of the data object held in the dynamic cache. If the byte representation is found it can be converted from the byte array representation back into an object representation and stored in the local cache for future use. The object representation can be returned back to the AJAX implementation, so the implementation can communicate with the back end server and return the appropriate data, as requested. This ensures that the UI component can work seamlessly in a clustered data processing environment. Once a particular token and the data it represents is no longer required, it can be deleted from the cache and invalidated in the dynamic cache so that it is unavailable to all servers and cleaned up.

One example of this is within a Business Process Management ("BPM") system, a discipline that can leverage software and services to provide business solutions. The BPM server can be based on WEBSPHERE APPLICATION SERVER ("WAS"), and the BPM server can be run in a clustered environment. Web UI components may need to work seamlessly without requiring they be fixed to a single server for AJAX calls, when operating in a clustered environment. Additionally, components of IBM BPM can be delivered through a particular packaging structure which may have its own process for being installed, updated, and deployed.

FIG. 1 depicts a system for communicating data across a clustered environment, according to embodiments of the present disclosure. A web UI component 130 working with BPM can use an AJAX implementation (AJAX implementations 136-142 shown here) to communicate with a BPM server in order to communicate with a data serving back end system (backend server). The AJAX implementation (e.g. AJAX 136) may be installed on the BPM server (e.g. BPM server 104) as part of the BPM software. A clustered environment is shown, exemplar cluster WEBSPHERE APPLICATION SERVER (WAS) cluster 102, which comprises a number of identical servers (BPM Server 104-110). Each server contains a local cache (LC) and a dynamic cache, here exemplar dynamic cache depicted as WEBSPHERE DYNAMIC CACHE (WDC), as shown BPM Server 104 has a LC 112 and WDC 114, Server 2 106 has LC 116 and WDC 118, BPM Server 3 108 has LC 120 and WDC 122, and BPM Server 4 110 has LC 124 and WDC 126. Each server may also contain an AJAX implementation 136, 138, 140, and 142, respectively. The web UI component 130 can work with the AJAX implementation within the BPM server in order to access data from the backend server 134.

A token is created when the data it represents is placed into a local cache (exemplar local cache "LC 112"). The token can then be passed to the web UI component 130 over the network 132. The data entry to the LC 112 can then be serialized into byte array that can be stored in the WDC 114.

The data replication service (DRS) 128 will ensure that the data is replicated to a particular server or particular servers when needed.

As part of the rendering of the web UI component or by user interaction (depending on the web UI component configuration), the web UI 130 running in a web browser can make an initial request for a web page to BPM Server 1 104. In certain embodiments, the request and a response can be returned over one or more networks 132. The networks can include, but are not limited to, local area networks, point-to-point communications, wide area networks, the global Internet, and combinations thereof. A token can be sent from the web UI 130 to the BPM Server 1 104, specifically to the AJAX implantation 136. A web UI component can hold multiple tokens, with each token associated with a particular data object. Multiple web UI components can communicate with each server in a cluster in a clustered data processing environment. This request could go to any server in the cluster, but for illustrative purposes it will go to BPM Server 1 104, the server that presented the original web page.

As the request has been made to the server that presented the original web page, the data object requested can be found in the local cache 112. In response to detecting the data object associated with the token received by the AJAX implementation 136, the AJAX 136 can communicate with the backend server 134 over the network 132 to obtain server-specific data. This data can be received by the AJAX implementation 136 and can be returned, with other requested data, to the web UI component 130, in order to satisfy the initial request.

A subsequent request using the same token, which was previously created on BPM Server 1 104 in response to the web page request from the browser, can be made on a different server (here any of BPM Servers 2-4, 106-110). For example, the request for the data object with the same token can be made from the web UI component 130 of a browser to BMP Server 3 108 over the network 132. The AJAX implantation 140 can receive the token from the web UI component 130, along with the request, and initiate a search of the LC 120 for the data object associated with the token. If the data object in not found in the LC 120, a request can be made to the WDC 122 which either has the data associated with the token or it requests it from the owning server.

Consistent with embodiments, if the request went to a server other than the server that presented the original web page, the DRS 128 for the WAS Cluster 102 could replicate the data across the cluster. In order for the DRS 128 to replicate data, the data must be able to serialize and deserialize itself in order to be sent over the network. This is because the DRS 128 will, by default, know how to serialize and deserialize the byte array. Thus, data can be sent around without need for the DRS 128 to access the original class definitions. BPM Applications are packaged entities that do not allow their java classes to be exposed to the DRS, and complex manual work may be involved in order to extract the needed classes from the BPM package in order to expose them to DRS. This manual work may also have to be done for each server in the cluster.

Once the byte array for the data object associated with the token is identified, it can be deserialized into the LC 120 for any subsequent requests to BPM Server 3 108. The AJAX 140 can then use the data object to communicate with the backend server 134 over the network 132. The backend server 134 can provide server-specific data to the AJAX implementation 140, which can then be returned to the web UI component 130.

Figure 2:
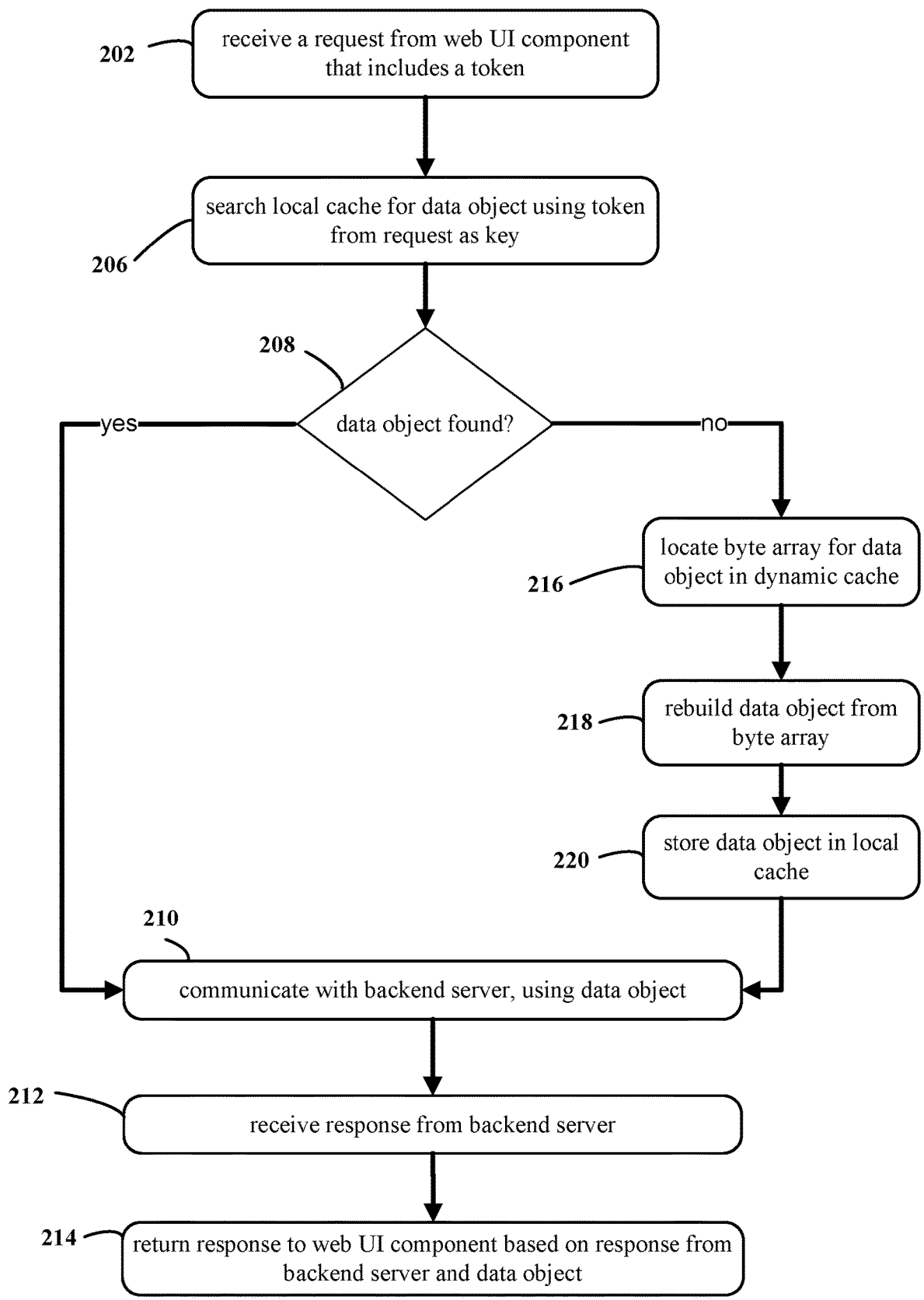
FIG. 2 depicts a flow diagram of a method for communicating data across a clustered environment, according to embodiments of the present disclosure.

FIG. 2 depicts a flow diagram of a method for communicating data across a clustered environment, according to embodiments of the present disclosure. The flow begins when the system receives a request from a web UI component to the backend server, per 202. This system may use asynchronous JavaScript and XML (AJAX) to receive requests from the web UI component to more seamlessly communicate data between a server and a user. With AJAX, web applications can send data to and retrieve data from a server asynchronously without interfering with the display and behavior of the existing page. In response to the request, the system can access the data object associated with the token requested. This token may have been created upon the initial storing of the particular data object in a local cache of a particular server. The token can be associated with the data object, and the token can represent, to the web UI component, configuration data including credentials or information regarding the server that needs to be used, or both or other information. Using the token, the system can search the local cache for the associated data object, per 206. If the data object is found in the local cache, per 208, the server can, using the data object, communicate with the backend server, per 210. The system can receive a response from the backend server, per 212. This response can be server-specific and in response to the specific request received by the system from the web UI component. The response from the backend server to the server (specifically, for example, to the AJAX implementation) can be processed based on further information defined in the data object to formulate the response back to the Web UI Component, per 214.

If the data object cannot be found in the local cache, per 208, the server can search the byte array representative of the data object in the dynamic cache, per 216. As described herein, the byte array can be communicated between servers through use of the system's already-present data replication service. Upon location of the byte array, the system can rebuild the data object from the byte array, per 218. This rebuilt data object can be stored in the server's local cache, for future use, per 220. The requested data object can then be used, per 210, to communicate with the backend server. The process can then repeat along the same path as though the data object had been located in the local cache at block 208. Thus, the system can receive a server-specific response from the backend server, per 212. The response from the backend server to the server (specifically, for example, to the AJAX implementation) can be processed based on further information defined in the data object to formulate the response back to the Web UI component, per 214.

Figure 3:
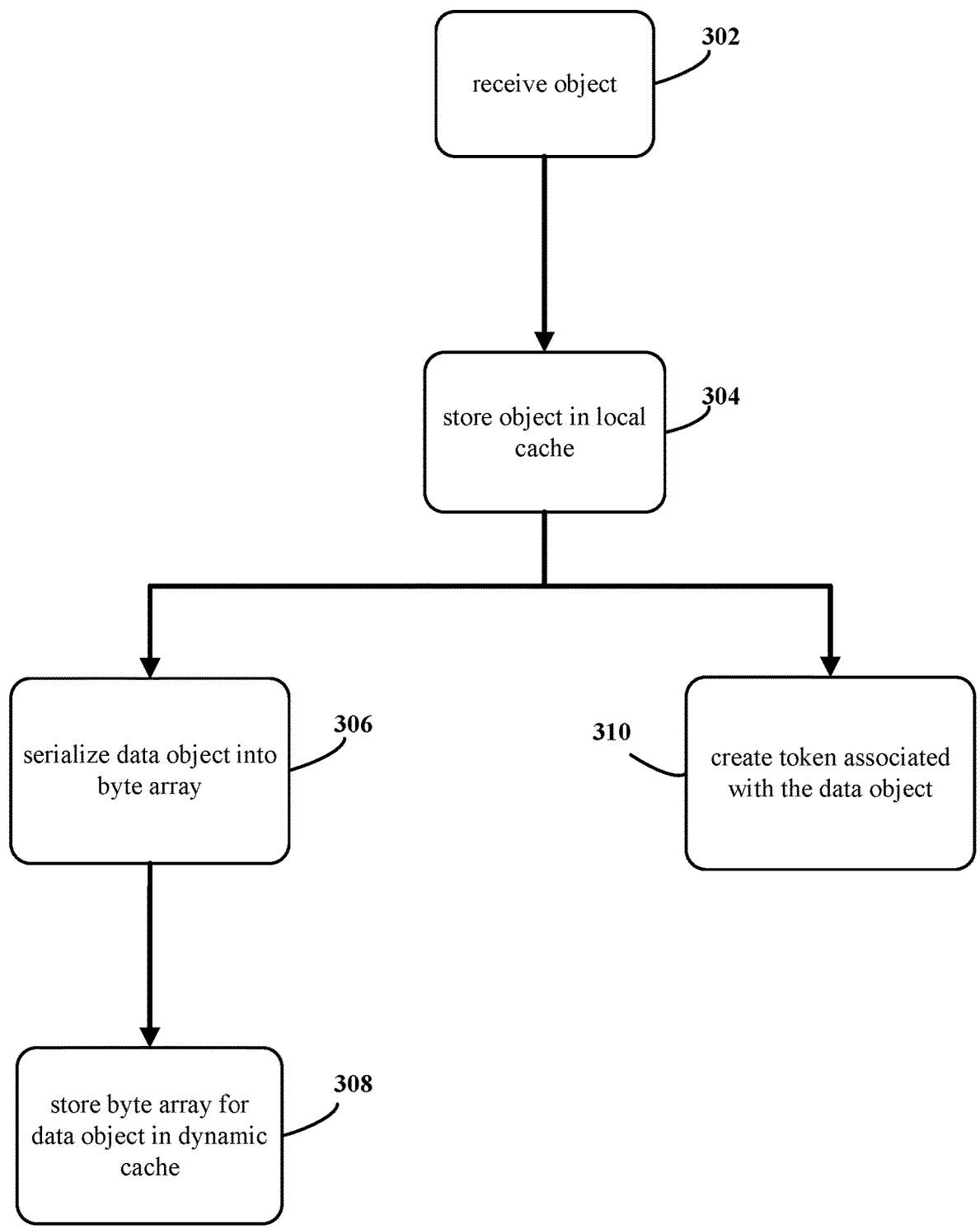
FIG. 3 depicts a flow diagram of a method for storing data objects on a server, according to embodiments in the present disclosure.

FIG. 3 depicts a flow diagram of a method for storing data objects on a server, according to embodiments in the present disclosure. The flow can begin when the server receives a data object, per 302. This object can be stored in a local cache, per 304. In response to the storing, a token can be created that is associated with the data object stored in the cache, per 310. The token can represent the data object in its entirety. The data object can contain information about, but not limited to, the backend server such as credentials as well as information on how to formulate the response back to the UI component. In addition to storing the data object in the local cache, the data object can be serialized into byte array, per 306. The byte array associated with the data object can be stored in a dynamic cache, for example the WEBSPHERE DYNAMIC CACHE, per 308. This byte array can be replicated by the underlying replication service, in order to allow for seamless data communication in a clustered environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
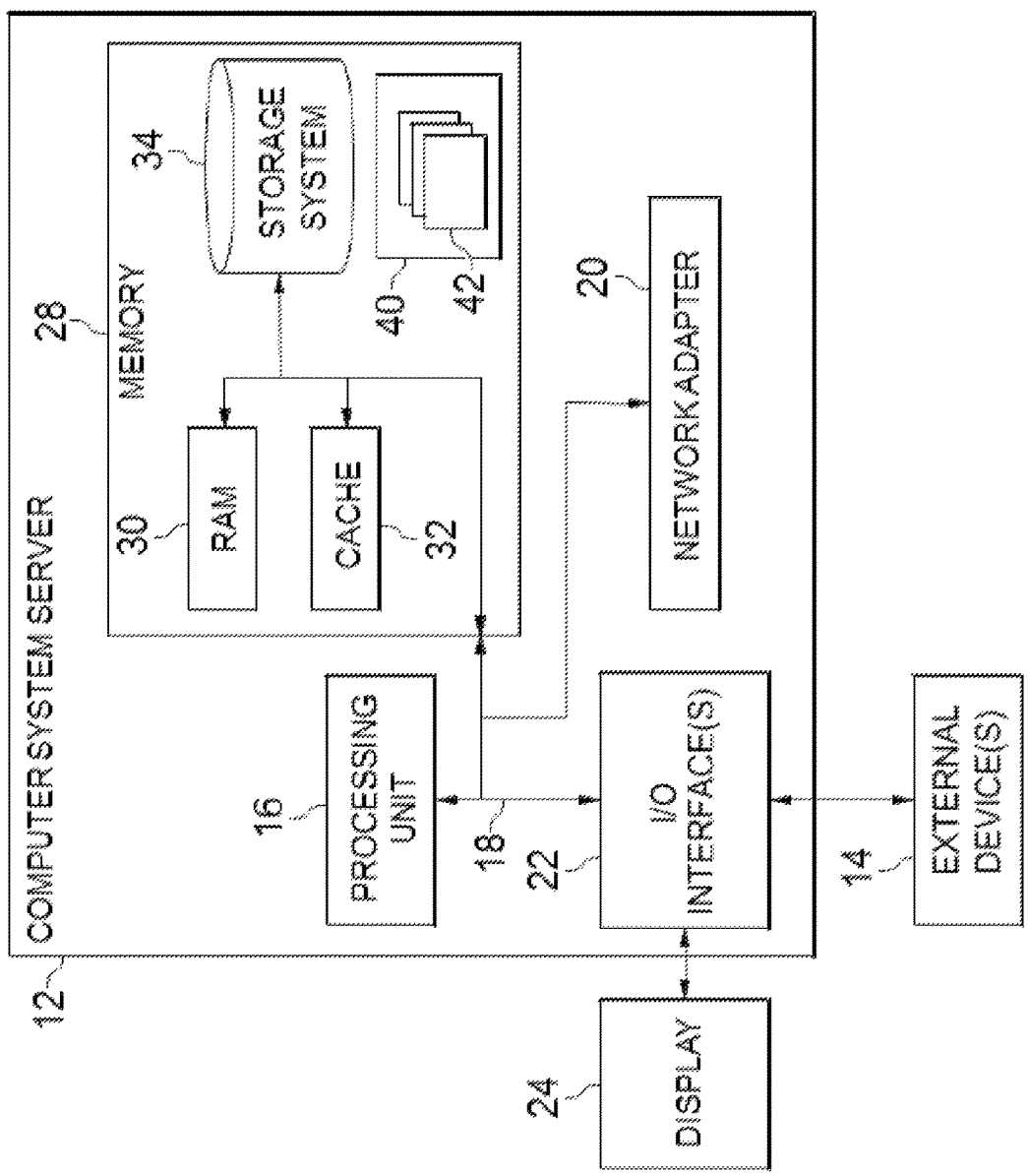
FIG. 4 depicts a cloud computing node according to an embodiment of the present disclosure.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
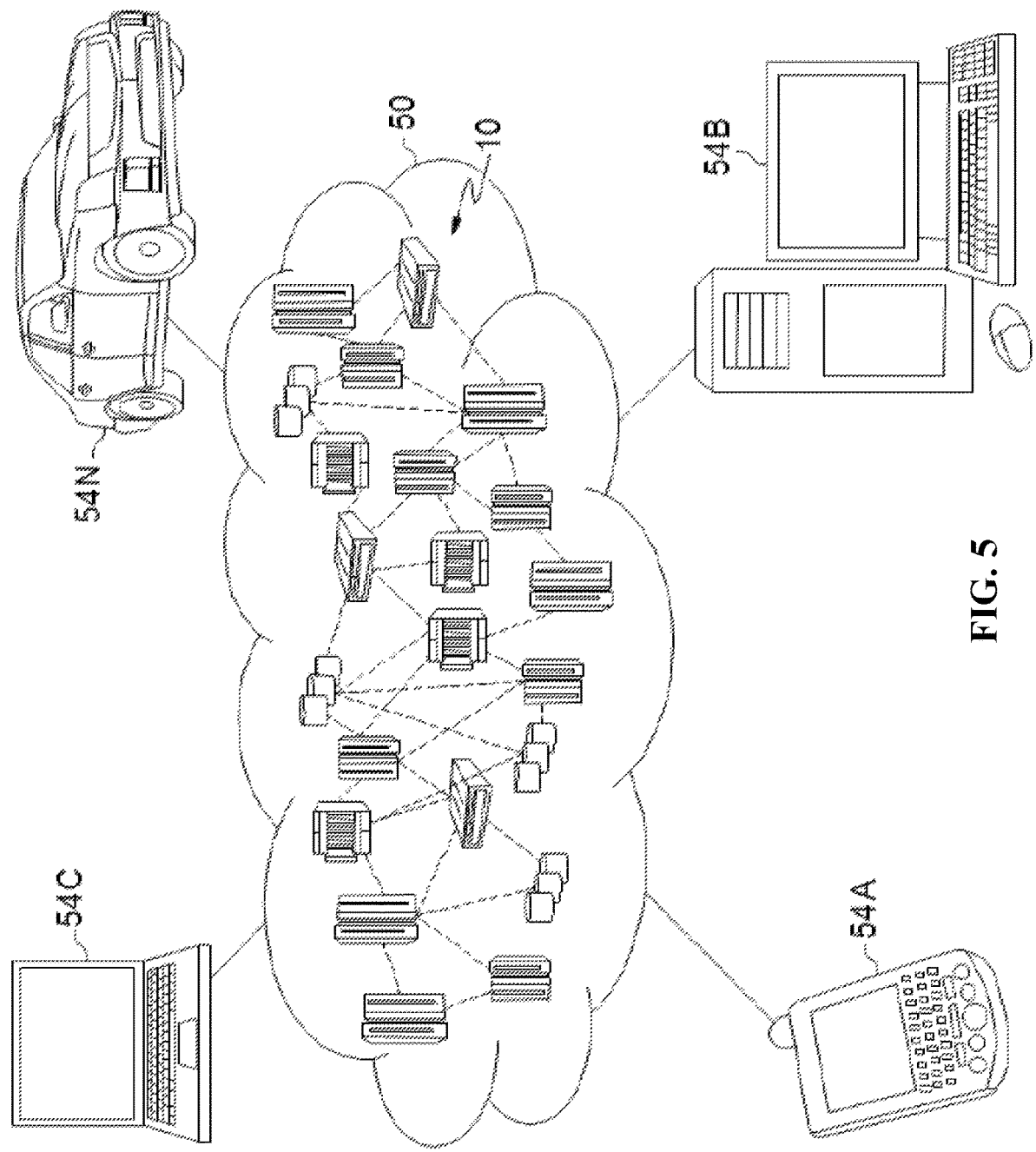
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
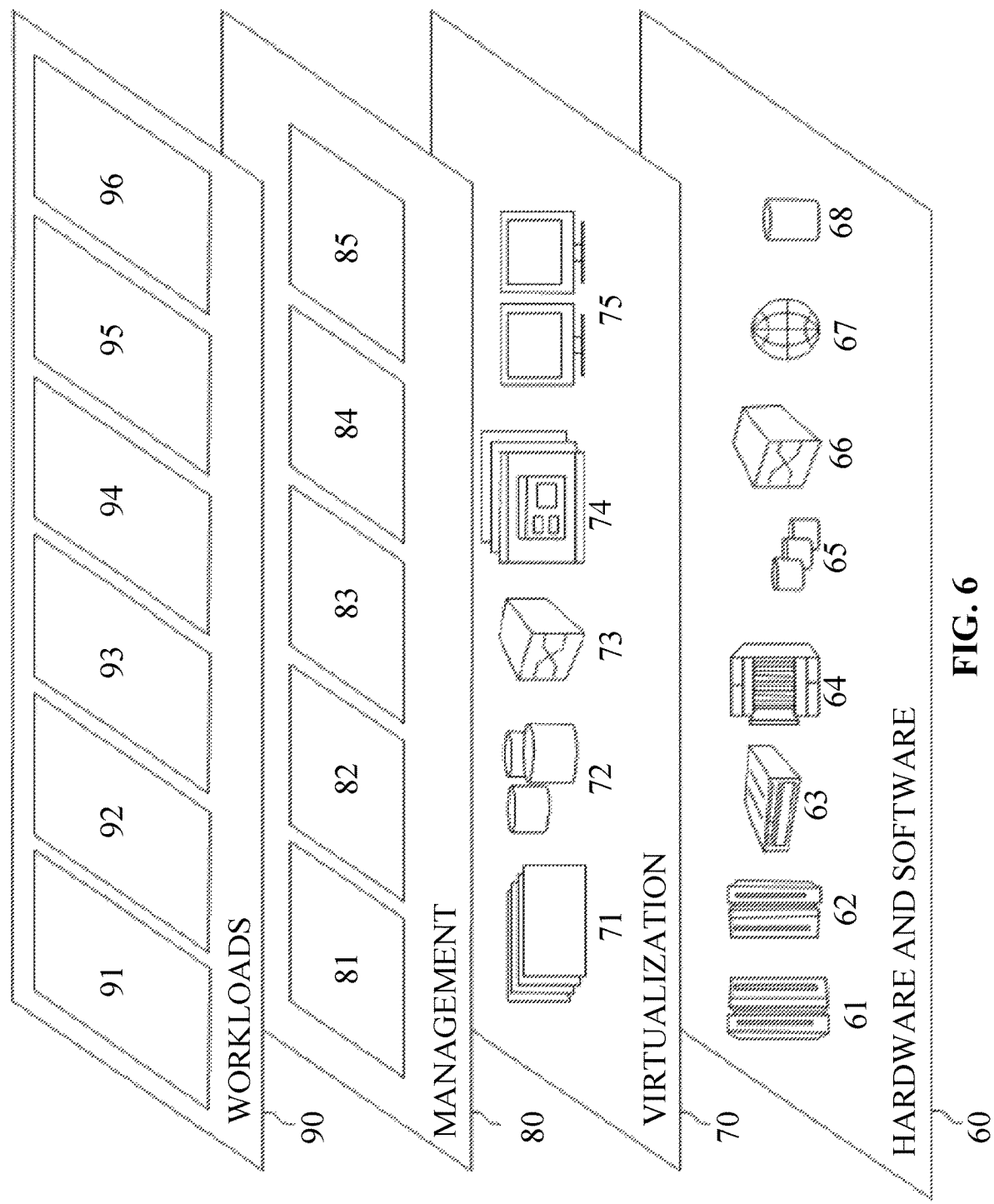
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communicating data 96.

The example pseudocode in table 1 illustrates one way the disclosed can be executed.

TABLE 1

| | Example Pseudocode |
|---|---|
| Init | Obtain reference to Websphere Dynamic Cache |
| | create Local Cache |
| AddDataObjectToCache | create unique token |
| | create cache key based on the token and name if name supplied. |
| | (the cache key can be looked up via a defined name or the unique token if required) |
| | put data object into local cache referenced by the cache key |
| | serialize the data object into a byte array and store in the Websphere Dynamic Cache using the same cache key. |
| GetDataObjectFromCache | create a lookup key from either the token or a name |
| | get data object from the local cache referenced by the lookup key |
| | if no data object is found |
| | * get the byte array representing the data object from the Websphere Dynamic Cache |
| | if found |
| | deserialize the byte array into an data object |
| | create a cache key from the lookup key |
| | put data object into local cache referenced by the cache key |
| | return the found data object |
| RemoveDataObjectFromCache | create a lookup key from either the token or a name |
| | locate and remove entry in local cache based on lookup key |
| | invalidate entry in Websphere Dynamic Cache based on lookup key |

The cache key referred to in Table 1 can be either a token or a token plus a name. The name can be seen as an alias to the token. The entry can be located in either a local cache or a WDC using a lookup key which can be a token or a name to find the entry in either cache. The aforementioned data objects (from the above example) can be put into the cache to hold the information about what backend server to talk to, the definition of the data to retrieve, and the manner in which to format the data to return it to the client UI component, or other information. The UI component can reference this data object via the unique token. The ability to reference the data object by a name can be used by server side components within the system.

The data object may be of a specific format, and the AddDataObjectToCache can serialize a data object into a byte array. Data objects can be JAXB class instances; thus these instances can be converted into an XML String representation which can then be converted to a byte array. The system could be extended to allow for any object as long as it implements an interface to represent itself as a series of bytes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for communicating data in a clustered data processing environment, the method comprising:

receiving, at a server in the clustered data processing environment, a request and a token from a web user interface (UI) component, the token created during storing of a data object in a local cache, wherein the data object comprises a set of credentials, and wherein the token includes a specific configuration, credential, and referenced server;

searching, based on the token and for the data object, the local cache, wherein the data object comprises a set of backend response configurations and wherein the backend response configurations are unique to a particular user of the web UI component;

detecting, in response to the searching, the data object in the local cache;

communicating, using the data object, with a backend server;

receiving, from the backend server and in response to the request, server-specific data;

returning, to the web UI component, based on the server-specific data from the backend server and data held in the data object, a response, wherein the response is formulated based on a set of data defined in the data object;

receiving, at the server in the clustered data processing environment, a second request and a second token from a second web UI component, the second token created during storing of a second data object in another local cache on another server in the clustered data environment;

searching, based on the second token and for the second data object, the local cache;

detecting, in response to the searching based on the second token and for the second data object, an absence of the second data object in the local cache;

locating, in response to the detecting the absence of the second data object and in a dynamic cache, a byte array for the second data object, the byte array created during the storing of the second data object in the dynamic cache;

rebuilding, based on the byte array for the second data object, the second data object;

storing, in the local cache, the rebuilt second data object;

communicating, using the second data object, with the backend server;

receiving, from the backend server and in response to the second request, server-specific data;

returning, to the second web UI component, based on the server-specific data from the backend server and data held in the second data object, a second response;

determining the token is no longer required; and deleting the token created during the storing of the data object.

2. The method of claim 1, further comprising:

storing, prior to the receiving the request from the web UI component, the data object in the local cache;

creating, in response to the storing of the data object, the token;

serializing, in response to the storing of the data object in the local cache, the data object into byte array; and storing the byte array for the data object in a dynamic cache.

3. The method of claim 1, wherein the web UI component uses asynchronous JavaScript and XML (AJAX) to communicate with a server.

4. The method of claim 1, further comprising:

determining the data object is no longer required; and deleting, from the local cache, the data object.

* * * * *